US008024486B2

(12) United States Patent
Beers et al.

(10) Patent No.: US 8,024,486 B2
(45) Date of Patent: Sep. 20, 2011

(54) CONVERTING DATA FROM A FIRST NETWORK FORMAT TO NON-NETWORK FORMAT AND FROM THE NON-NETWORK FORMAT TO A SECOND NETWORK FORMAT

(75) Inventors: Ted W Beers, Corvallis, OR (US); Mark E Gorzynski, Corvallis, OR (US); William C Wickes, Corvallis, OR (US); Jon A Brewster, Monmouth, OR (US); Garrett Daniel Gargan, Corvallis, OR (US); Jeffrey L Thielman, Corvallis, OR (US); Scott Grasley, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 11/911,499

(22) Filed: Oct. 12, 2007

(65) Prior Publication Data

US 2009/0300198 A1 Dec. 3, 2009

Related U.S. Application Data

(60) Provisional application No. 60/894,802, filed on Mar. 14, 2007.

(51) Int. Cl.
*G06F 15/16* (2006.01)
(52) U.S. Cl. ........................................ 709/249; 709/246
(58) Field of Classification Search ................. 709/231, 709/246, 249; 348/441; 455/3.06; 725/78–85
See application file for complete search history.

(56) References Cited

U.S. PATENT DOCUMENTS

| 4,831,620 | A | 5/1989 | Conway et al. |
|---|---|---|---|
| 5,374,952 | A | 12/1994 | Flohr |
| 5,515,511 | A | 5/1996 | Nguyen et al. |
| 5,844,600 | A | 12/1998 | Kerr |
| 5,859,852 | A | 1/1999 | Moura et al. |
| 5,968,176 | A | 10/1999 | Nessett et al. |
| 5,974,449 | A | 10/1999 | Chang et al. |
| 5,999,966 | A | 12/1999 | McDougall et al. |
| 6,047,325 | A | 4/2000 | Jain et al. |
| 6,262,978 | B1 | 7/2001 | Bruno et al. |
| 6,389,550 | B1 | 5/2002 | Carter |
| 6,496,862 | B1 | 12/2002 | Akatsu et al. |
| 6,584,493 | B1 | 6/2003 | Butler |

(Continued)

FOREIGN PATENT DOCUMENTS

EP 0 817 484 A 1/1998

(Continued)

OTHER PUBLICATIONS

DARPA. "Internet Protocol", Request for Comments (RFC) 791, Sep. 1981, 51 pages.*

(Continued)

*Primary Examiner* — George C Neurauter, Jr.

(57) ABSTRACT

A system including a first node configured to receive first data in a first format that specifies a network destination for the first data and convert the first data to second data in a second format that does not specify a network destination for the second data and a second node configured to receive the second data from the first node over a first connection and convert the second data to third data in a third format that specifies a network destination for the third data is provided.

25 Claims, 4 Drawing Sheets

U.S. PATENT DOCUMENTS

| | | | |
|---|---|---|---|
| 6,590,603 | B2 | 7/2003 | Sheldon et al. |
| 6,697,476 | B1 | 2/2004 | O'Malley et al. |
| 6,704,873 | B1 | 3/2004 | Underwood |
| 6,748,420 | B1 | 6/2004 | Quatrano et al. |
| 6,781,601 | B2 | 8/2004 | Cheung |
| 6,816,462 | B1 | 11/2004 | Booth, III et al. |
| 6,831,899 | B1 | 12/2004 | Roy |
| 6,862,622 | B2 | 3/2005 | Jorgensen |
| 6,901,448 | B2 | 5/2005 | Zhu et al. |
| 6,928,070 | B2 | 8/2005 | Emerson, III |
| 6,961,416 | B1 | 11/2005 | Summers et al. |
| 7,043,528 | B2 | 5/2006 | Schmitt et al. |
| 7,062,025 | B2 | 6/2006 | Summers et al. |
| 7,120,139 | B1 | 10/2006 | Kung et al. |
| 7,133,514 | B1 | 11/2006 | Cook et al. |
| 7,373,414 | B2 * | 5/2008 | Evron et al. ............... 709/231 |
| 2002/0031131 | A1 | 3/2002 | Yemini et al. |
| 2002/0107923 | A1 | 8/2002 | Chu et al. |
| 2003/0023873 | A1 | 1/2003 | Ben-Itzhak |
| 2003/0081112 | A1 | 5/2003 | Sheldon et al. |
| 2003/0142662 | A1 | 7/2003 | Mahajan |
| 2004/0032881 | A1 | 2/2004 | Arai |
| 2004/0047342 | A1 | 3/2004 | Gavish et al. |
| 2004/0162871 | A1 | 8/2004 | Pabla et al. |
| 2004/0210674 | A1 | 10/2004 | Gbadegesin |
| 2005/0021620 | A1 | 1/2005 | Simon et al. |
| 2005/0024487 | A1 | 3/2005 | Chen |
| 2005/0089052 | A1 | 4/2005 | Chen et al. |
| 2005/0094578 | A1 | 5/2005 | Pasha et al. |
| 2005/0117605 | A1 | 6/2005 | Yan et al. |
| 2005/0213739 | A1 | 9/2005 | Rodman et al. |
| 2005/0226172 | A1 | 10/2005 | Richardson et al. |
| 2005/0243742 | A1 | 11/2005 | Hansen |
| 2005/0283536 | A1 | 12/2005 | Swanson et al. |
| 2006/0020715 | A1 | 1/2006 | Jungck |
| 2006/0047749 | A1 | 3/2006 | Davis et al. |
| 2006/0047750 | A1 | 3/2006 | Schmitt et al. |
| 2006/0233527 | A1 | 10/2006 | Murata et al. |
| 2006/0238648 | A1 * | 10/2006 | Wogsberg ............... 348/441 |
| 2006/0239294 | A1 * | 10/2006 | Wogsberg ............... 370/466 |
| 2007/0050448 | A1 | 3/2007 | Gonen et al. |
| 2007/0101024 | A1 * | 5/2007 | Doumuki et al. ............... 709/246 |
| 2007/0162753 | A1 * | 7/2007 | Nakano et al. ............... 713/171 |
| 2008/0304486 | A1 | 12/2008 | Graessley et al. |

FOREIGN PATENT DOCUMENTS

| | | |
|---|---|---|
| WO | 02/25908 A | 3/2002 |
| WO | WO 02/25908 A2 | 3/2002 |
| WO | 03/009563 A1 | 1/2003 |

OTHER PUBLICATIONS

Schultzrinne, H. et al. "RTP: A Transport Protocol for Real-Time Applications", Request for Comments (RFC) 3550, Jul. 2003, 89 pages.*

Chen et al, "ATM Switching Systems", 1995, ISBN 0-89006-682-5, p. 7.

York Telecom, ISDN to IP Videoconferencing Migration, Jan. 2003, accessible from http://whitepapers.zdnet.co.uk/0,1000000651,260081421p,00.htm on Jan. 20, 2010.

Shukla, Anaradha, Global IP Solutions Releases GIPS LSVX Video Codex, Mar. 23, 2007, accessible from http://ipcommunications.tmcnetcom/hot-topics/video/articles/5864-global-ip-solutions-re-leases-gips-lsvx-video-codec.htm/content.aspx on Jan. 20, 2010.

Singh, Gurmeet, Secure Video Conferencing for Web Based Security Surveillance System, Jul. 2006, accessible from http://www.security.iitk.ac.in/contents/repository/more/gurmeet.pdf on Jan. 20, 2010.

Metters, Jens et al., A Video Gateway to Support Video Streaming to Mobile Clients, Oct. 1997, accessible from http://www.kn-s.dir.de/People/Strang/summit97b.ps on Jan. 20, 2010.

Wainhouse Research, Security for Videoconferencing: A Guide to Understanding, Planning, and Implementing Secure Compliant ISDA & IP Videoconferencing Solutions, Jan. 2004, accessible from http://www.cityis.com/assets/downloads/securityforvideocon.pdf on Jan. 20, 2010.

Unknown, "Merlin AM-1", Aug 16, 2007, www.atecom.com.

Vian Cooper, "Video Over BPON with Integrated VDSL", Fujitsu Sci. Tech. V 37(1), pp. 87-96 on Feb. 28, 2001.

* cited by examiner

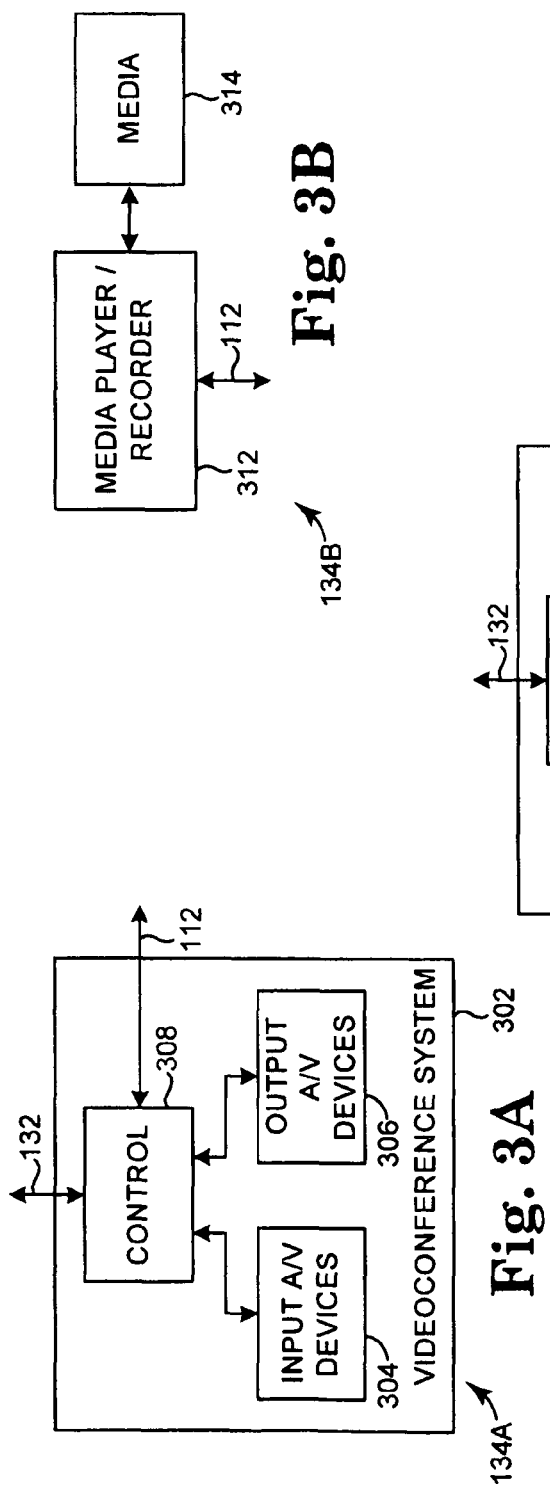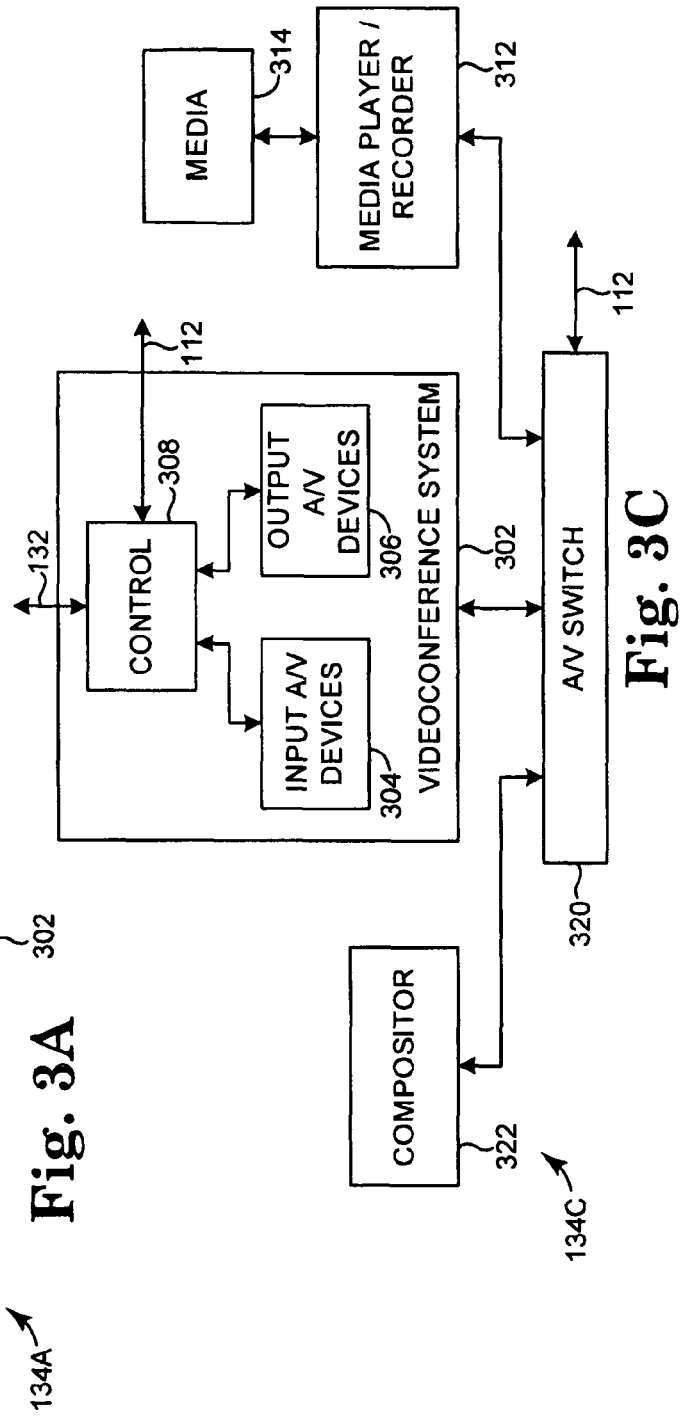

CONVERTING DATA FROM A FIRST NETWORK FORMAT TO NON-NETWORK FORMAT AND FROM THE NON-NETWORK FORMAT TO A SECOND NETWORK FORMAT

CROSS REFERENCE TO RELATED APPLICATIONS

This application is related to and claims the benefit of U.S. patent Ser. No. 11/911,496, entitled "Synthetic Bridging", filed concurrently on Jul. 31, 2007 and is hereby incorporated by reference in its entirety. This application claims the benefit of U.S. Provisional Application No. 60/894,802, filed Mar. 14, 2007, which is hereby incorporated by reference in its entirety.

BACKGROUND

Video teleconferencing systems allow for collaboration between people in different locations. These systems allow participants to interact with one another through the use of audio and video equipment that provides real time audio and video communications. Given the complexity of connecting people across various locations and adherence to various teleconferencing standards, these systems may provide limitations on the ways participants can exchange information. In addition, these systems may connect to a publicly available network, such as the Internet, which may subject them to security risks from hackers.

BRIEF DESCRIPTION OF THE DRAWINGS

FIGS. 3A-3C are block diagrams illustrating embodiments of A/V gear in a content node.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

As described herein, a media collaboration system transports audio/video (A/V) data into and out of a collaborative session, such as a videoconference, while protecting and insulating the network infrastructures and associated media resources of session attendees. The collaborative session may take place in two or more locations (e.g., different cities) to connect one or more users or media resources in each of the locations. Cameras and microphones, for example, may capture video and audio from one or more of the locations and the video and audio may be output using one or more display devices and speakers, for example, at one or more other locations. In addition, various types of pre-recorded A/V data, such as a DVD, may be transported to one or more of the locations where it may be output using a display device or speakers, for example. One or more locations of the videoconference may include arrangements of office furniture (e.g., office chairs and a conference table) and A/V gear to provide users with gaze awareness and a full immersion feeling.

The media collaboration system transports at least a portion of the A/V data into and out of a collaborative session across at least two unrelated networks where at least one of the networks is a trusted network. The media collaboration system prevents network information from being exchanged between the unrelated networks. When a node in the system receives A/V data from a network, the node converts the A/V data from a network format that specifies a network destination for the A/V data to a non-network A/V format that does not specify a network destination for the A/V data. The node then provides the converted A/V data to another node across a non-network A/V connection. The node that receives the non-network A/V data converts the A/V data from the non-network A/V format to a network format that specifies a network destination for the A/V data and provides the network A/V data on another network that is connected to the network destination for the A/V data.

Although the media collaboration system will be described herein as transporting A/V data into and out of a collaborative session, the system may also be used to exchange any other types of data or control content, such as control signals used to drive a computer application remotely, in other embodiments.

Figure 1A:
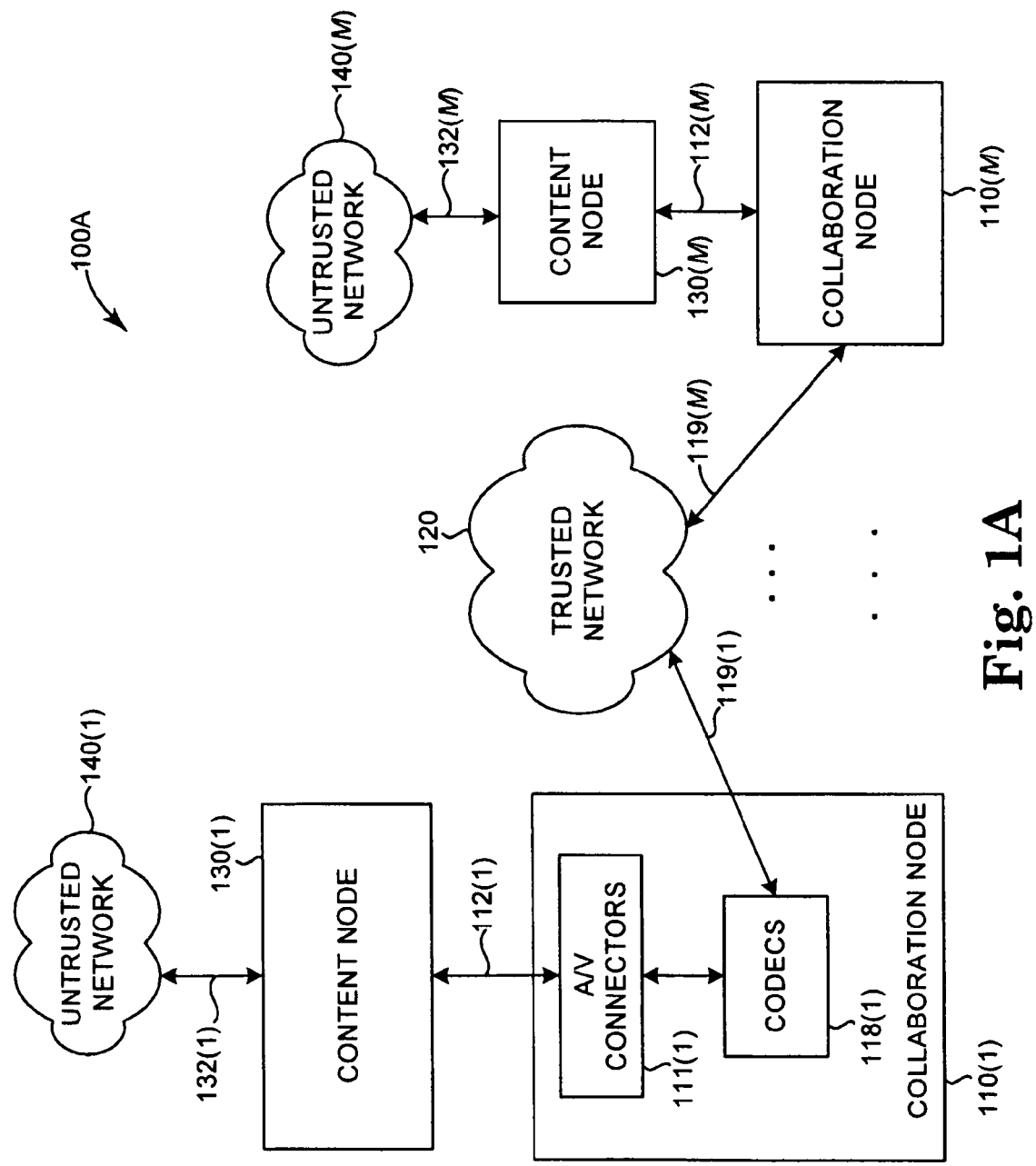
FIGS. 1A-1B are block diagrams illustrating embodiments of a media collaboration system.
Figure 1B:
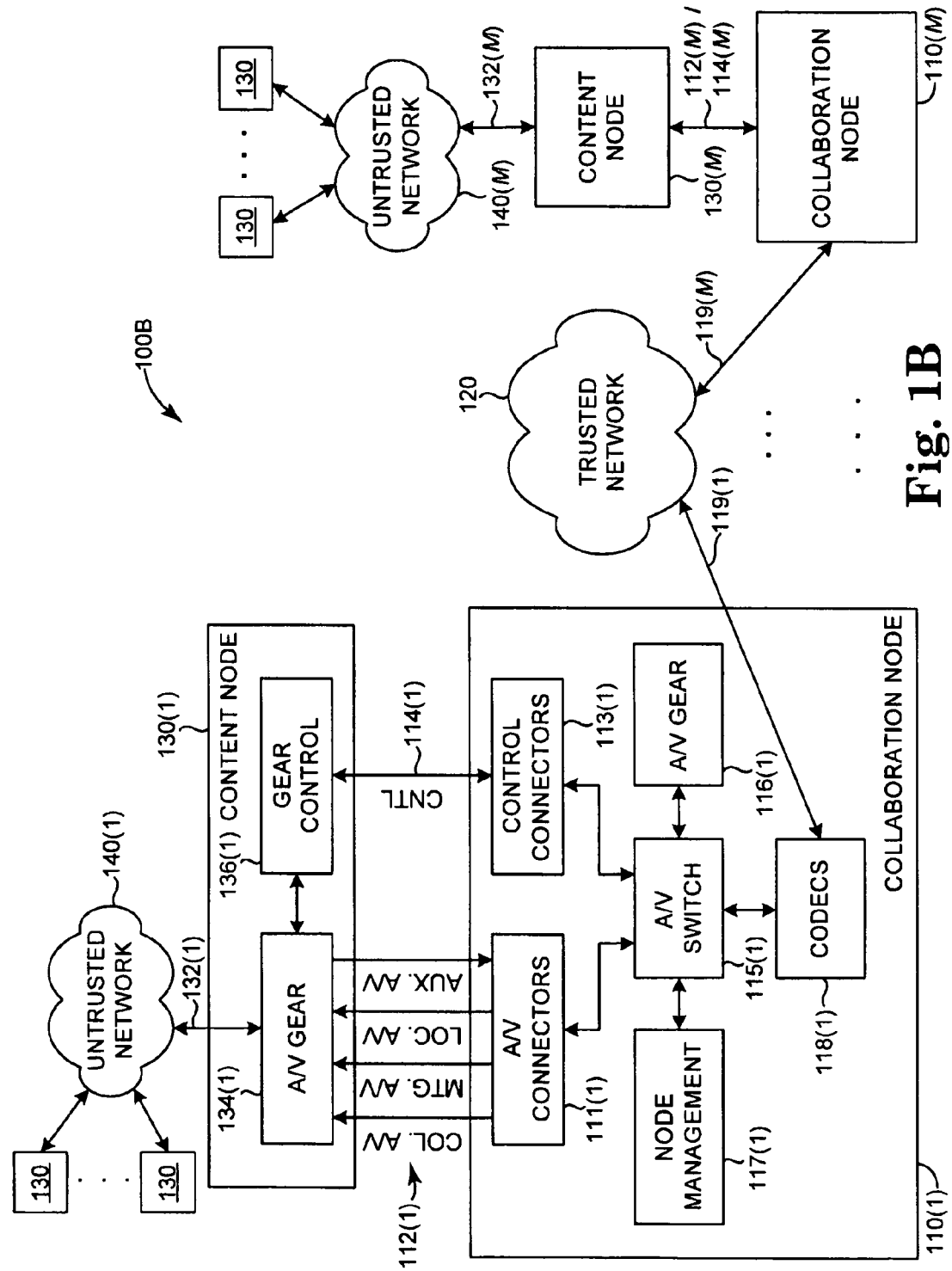

FIGS. 1A-1B are block diagrams illustrating respective embodiments 100A and 100B of a media collaboration system 100. Media collaboration system 100 forms a telepresence videoconferencing system where various A/V media streams from different sources are combined into a collaborative session in one embodiment. The media streams may be any combination of live or pre-recorded audio and/or video data that may be combined in any suitable way and output to any number of users in any number of locations by media collaboration system 100.

Referring to FIG. 1A, media collaboration system 100A includes collaboration nodes 110(1)-110(M), where M is greater than or equal to two, connected to a trusted network 120. Collaboration nodes 110(1)-110(M) connect to content nodes 130(1)-130(M), respectively, and content nodes 130(1)-130(M) connect to untrusted networks 140(1)-140(M), respectively. System 100A may also include any number of additional collaboration nodes 110 (not shown) that connect to trusted network 120 but do not connect to a content node 130. System 100A may further include any number of additional content nodes 130 connected to each untrusted network 140. In addition, one or more of untrusted networks 140(1)-140(M) may be interconnected or omitted in some embodiments.

Each collaboration node 110 includes a set of A/V connectors 111 that connects to content node 130 across A/V connections 112. A/V connectors 111 may be any suitable type and combination of conventional standard digital and analog A/V interfaces such as composite video, component video, S-Video, analog HD, balanced stereo audio, SDI, HD-SDI, DVI, DVI-D, HDMI, VGA, or other suitable A/V interfaces without network features that might compromise security. A/V connectors 111 allow non-network A/V data to be input to and output from collaboration node 110 where the A/V data does not specify a network destination. The A/V data is usable by any A/V device that is configured to operate with the A/V interfaces of A/V connectors 111.

A/V connectors 111 connect to A/V connections 112. A/V connections 112 may be any suitable type and combination of conventional standard digital and analog A/V connections configured to operate with any of the example interfaces listed above or other suitable A/V interfaces. A/V connections 112 are configured to inherently prevent any useful network protocol information from being transmitted in either direction between content node 130 and collaboration node 110.

Each collaboration node 110 also includes a set of coding and decoding mechanisms (codecs) 118 that connect to at least the set of A/V connectors 111 and trusted network 120 across a network connection 119. For A/V data received across A/V connections 112, codecs 118 convert the A/V data from a non-network A/V format that does not specify a network destination to a network format that does specify a network destination and provides the A/V data in the network format to network 120 using network connection 119. Codecs 118 generate any suitable information for the network format to specify the network destination and include the information with the A/V data as specified by the network format. The information may include MAC addresses, IP addresses, ports, and/or routing information, for example.

For A/V data received across network 120 using network connection 119, codecs 118 convert the A/V data from a network format that specifies a network destination to a non-network A/V format that does not specify a network destination and provides the A/V data in the non-network A/V format to content node 130 using A/V connections 112. Codecs 118 remove all information from the network format that specifies a network destination. The removed information may include MAC addresses, IP addresses, ports, and/or routing information, for example.

In one embodiment, codecs 118 convert the A/V data received across A/V connections 112 in a non-network A/V format to an Internet Protocol (IP) format. In this embodiment, codecs 118 generate IP packets to include the A/V data and also include information in each packet that specifies a destination of the packet across network 120. By doing so, codecs 118 convert the A/V data from a non-network A/V format to an IP format. Codecs 118 provide the A/V data in the IP format to network 120 using network connection 119.

Codecs 118 also convert the A/V data received across network connection 119 in an IP format to a non-network A/V format in this embodiment. Codecs 118 extract A/V data from each IP packet received from network 120 and discard the network destination information. Codecs 118 combine the extracted A/V data into a non-network A/V format to convert the A/V data from an IP format to a non-network A/V format. Codecs 118 provide the A/V data in the non-network A/V format to content node 130 using A/V connections 112.

In other embodiments, codecs 118 convert A/V data to and from other network formats.

Network connection 119 may be any suitable network connection between collaboration node 110 and trusted network 120. For example, network connection 119 may be a leased line (i.e., a T3, optical, cable, or wireless high speed link) which provides a large data pipe to and from collaboration node 110.

Trusted network 120 may be any suitable, secure application network such as a collaborative transport network. Trusted network 120 may be a local, regional, or global network that includes any suitable network configuration that ranges from a local point-to-point connection between two collaboration nodes 110 to a global array of connections that connect many collaboration nodes 110. Accordingly, trusted network 120 may not include and may not provide network connections to a publicly available network such as the Internet in some embodiments. Network 120 may be designed specifically to optimize high bandwidth with low latency to be able to transport live, interactive, audio, video, and other data rich media streams. Trusted network 120 may have a smallest link of 45 Mbps to avoid any significant serialization delay. Trusted network 120 may also use a flat network topology to minimize latency. In order to keep a high quality end-user experience, trusted network 120 may keep the total one-way latency between two collaboration nodes 110 to less than one-quarter of a second. This total latency may encompass all aspects of encoding/decoding, encapsulation/de-encapsulation, capture and presentation, filtering, processing, compression and decompression and transport latencies across the transmission path. As the contribution of each component of network 120 to overall latency decreases (as technology improves), the length of the "reach" of where different sites can be physically located may be increased.

To better preserve the shortest paths capable of reliable delivery with little packet loss, bandwidth and network resource mechanisms (not shown) may be used to insure high-quality sessions for the duration of the collaboration session. As most traffic streams are presumed to take place linking a pair or small number of end sites together for any given session, network 120 may have little presumption of session pre-emption once authorized sessions commence.

In some embodiments, longer latency and/or loss tolerant sessions may be provided over network 120. Such services may include directory, presence, messaging, credential verification, and time/name services for examples.

The interior of network 120 may concentrate on speedy delivery of traffic flows. Any access control, encryption/decryption and other proxy services, if needed may occur at the edge of the network such as in collaboration node 110 or content node 130 and not the interior of network 120. This design may make the core of the backbone of network 120 simpler to grow, maintain, stable, and very fast.

Each content node 130 connects to a collaboration node 110 using A/V connections 112 and to an untrusted network 140 using a network connection 132. Each content node 130 is configured to convert the A/V data between one or more A/V formats and one or more network format. For A/V data received across A/V connections 112, content node 130 converts the A/V data from a non-network A/V format that does not specify a network destination to a network format that does specify a network destination and provides the A/V data in the network format to network 140 using network connection 132. Content node 130 generates any suitable information for the network format to specify the network destination and includes the information with the A/V data as specified by the network format. The information may include MAC addresses, IP addresses, ports, and/or routing information, for example.

For A/V data received across network 140 using network connection 132, content node 130 converts the A/V data from a network format that specifies a network destination to a non-network A/V format that does not specify a network destination and provides the A/V data in the non-network A/V format to collaboration node 110 using A/V connections 112. Content node 130 removes all information from the network format that specifies a network destination. The removed information may include MAC addresses, IP addresses, ports, and/or routing information, for example.

In one embodiment, content node 130 converts the A/V data received across A/V connections 112 in a non-network A/V format to an Internet Protocol (IP) format. In this embodiment, content node 130 generates IP packets to include the A/V data and also include information in each packet that specifies a destination of the packet across network 120. By doing so, content node 130 converts the A/V data from a non-network A/V format to an IP format. Content node 130 provides the A/V data in the IP format to network 140 using network connection 132.

Content node 130 also converts the A/V data received across network connection 132 in an IP format to a non-network A/V format in this embodiment. Content node 130 extracts A/V data from each IP packet received from network 140 and discards the network destination information. Content node 130 combines the extracted A/V data into a non-network A/V format to convert the A/V data from an IP format to a non-network A/V format. Content node 130 provides the A/V data in the non-network A/V format to collaboration node 110 using A/V connections 112.

In other embodiments, content node 130 converts A/V data to and from other network formats.

Network connection 132 may be any suitable network connection between content node 130 and untrusted network 140. For example, network connection 132 may be a leased line (i.e., a T3, optical, cable, or wireless high speed link) which provides a large data pipe to and from content node 130.

Each untrusted network 140 may be any type of network formed from any number of network devices that operate using any suitable network protocol or protocols and are connect to any number of content nodes 130 or other computer or storage systems. Each network 140 may be a secure network, such as an enterprise network or corporate intranet, with limited and secure connections to other systems or an unsecure network with any combination of secure and unsecure connections to other systems. Each network 140 may be private or publicly available and include one or more connections to the Internet.

Each untrusted network 140 is considered "untrusted" by collaboration node 110 and/or trusted network 120 because collaboration node 110 and/or trusted network 120 may have no information regarding the level of security of an untrusted network 140. None of the untrusted networks 140, however, affects the security level of collaboration node 110 and/or trusted network 120 because any data that is transmitted between network 120 and any of networks 140 is transmitted in a non-network format across connections 112. Connections 112, in conjunction with collaboration nodes 110 and content nodes 130, provide a secure, reliable transport mechanism between network 120 and a network 140 without a network path (e.g., an IP path) between the two networks. Accordingly, collaboration media may be transported between any two untrusted networks 140 across trusted network 120 using the respective sets of A/V connections 112 as described above.

FIG. 1B illustrates an embodiment 100B of media collaboration system 100. Media collaboration system 100B operates like media collaboration system 100A as described above but with additional features that will now be described.

System 100B includes any number of additional content nodes 130 connected to each untrusted network 140. As with system 100A, one or more of untrusted networks 140(1)-140(M) may be interconnected or omitted in some embodiments.

Each collaboration node 110 in system 100B includes a set of one or more control connectors 113 that connect to a set of one or more control connections 114, an A/V switch 115, A/V gear, and a node management unit 117 in addition to the set of A/V connectors 111 and codecs 118.

A/V connectors 111 include at least one auxiliary A/V interface, at least one local A/V interface, at least one meeting A/V interface, and at least one collaboration A/V interface. A/V connections 112 include at least one auxiliary A/V connection (AUX. A/V), at least one local A/V connection (LOC. A/V), at least one meeting A/V connection (MTG. A/V), and at least one collaboration A/V connection (COL. A/V).

Each auxiliary A/V connection provides non-network A/V data in a non-network A/V format from content node 130 to collaboration node 110. As will be described in additional detail below, the A/V data from content node 130 may be generated in content node 130 or generated by another content node 130 that provides the A/V data over network 140 to the content node 130 that connects to the auxiliary A/V connection.

Each local A/V connection provides non-network A/V data in a non-network A/V format that is generated in collaboration node 110 from collaboration node 110 to content node 130. In one embodiment, the local A/V connections include three video connections from three video sources in collaboration node 110 and one audio connection from an audio source in collaboration node 110 that combines the audio from the three video sources.

Each meeting A/V connection provides non-network A/V data in a non-network A/V format that is generated in a remote collaboration node 110 or content node 130 and transmitted across network 120 from collaboration node 110 to content node 130. In one embodiment, the meeting A/V connections include three video connections from three video sources a remote collaboration node 110 or content node 130 and one audio connection from an audio source the remote collaboration node 110 or content node 130 that combines the audio from the three video sources. The video and audio sources are provided to the collaboration node 110 that connects to the meeting A/V connections across network 120.

Each collaboration A/V connection provides non-network A/V data in a non-network A/V format from collaboration node 110 to content node 130. Each collaboration A/V may output a corresponding input from an auxiliary A/V connection with or without additional processing by collaboration node 110.

In other embodiments, A/V connections 112 may include other numbers, types, and/or combinations of A/V connections.

Each collaboration node 110 also includes a set of control connectors 113 that connects to content node 130 across control connections 114. Control connectors 113 may be any suitable type and combination of digital and analog non-network control interfaces that allow non-network control signals to be input to and output from collaboration node 110 where the control signals do not specify a network destination. The control signals are usable by any controllable device that is configured to operate with the control interfaces of control connectors 113.

Control connectors 113 connect to control connections 114. Control connections 114 may be any suitable type and combination of digital and analog control connections that are configured to inherently prevent any useful network protocol information from being transmitted in either direction between content node 130 and collaboration node 110.

Each collaboration node 110 further includes an A/V switch 115. A/V switch 115 connects to A/V connectors 111, control connectors 113, A/V gear 116, node management unit 117, and codecs 118. A/V switch 115 routes A/V data in response to control signals from node management unit 117 and/or control signals received across control connectors 113. In particular, A/V switch 115 routes A/V data between A/V connectors 111 and codecs 118 in both directions, between codecs 118 and A/V gear 116 in both directions, and between A/V connectors 111 and A/V gear 116 in both directions.

A/V gear 116 includes any type, number, and combination of audio and video input and output devices. Examples of input devices include microphones, still and video cameras, media players, and computer and storage systems. The input devices may provide live or pre-recorded media. Examples of output devices include speakers, headphones, headsets, media recorders, and display devices such as projectors, computer monitors, and televisions. In one embodiment, A/V gear 116 includes integrated A/V gear that forms a collaboration studio such as a "Halo studio" offered by Hewlett-Packard Co.

Figure 2:
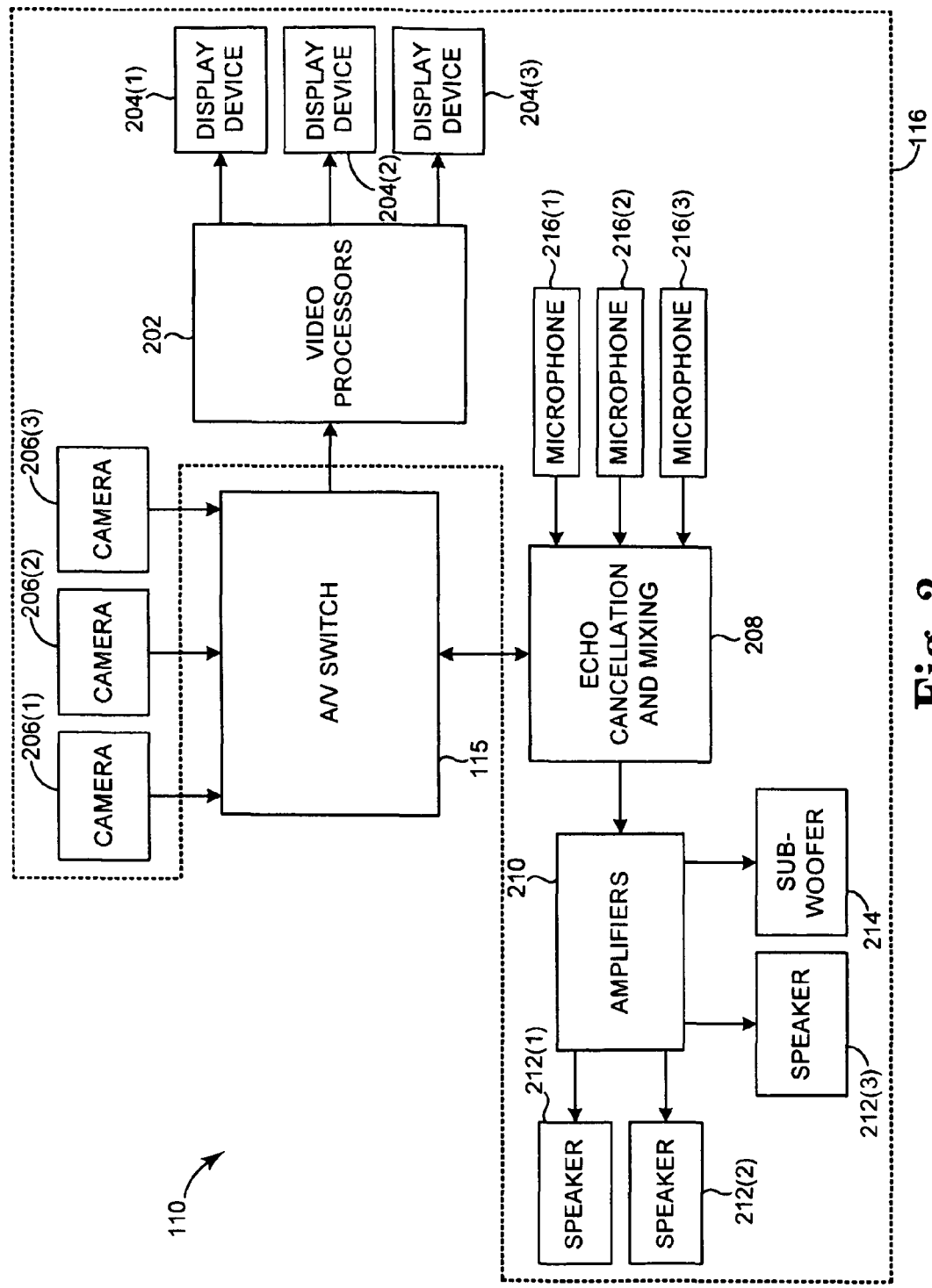
FIG. 2 is a block diagram illustrating one embodiment of selected portions of a collaboration node.

FIG. 2 is a block diagram illustrating one embodiment of A/V gear 116 connected to A/V switch 115 in collaboration node 110. In the example of FIG. 2, video processors 202 provide video data from A/V switch 115 to display devices 204(1)-204(3), and display devices 204(1)-204(3) display the video data. Cameras 206(1)-206(3) capture video data and provide the video data to A/V switch 115. An echo cancellation and mixing unit 208 mixes and processes audio data from A/V switch 115 and provides the processed audio data to amplifiers 210. Amplifiers 210 amplify the audio data and provide the audio data to speakers 212(1)-212(3) and sub-woofer 214. Speakers 212(1)-212(3) output the higher frequencies of the audio data, and sub-woofer 214 outputs the lower, bass frequencies of the audio data. Microphones 216(1)-216(3) capture audio data and provide the audio data to A/V switch 115.

Display devices 204(1)-204(3) may be arranged in such a manner around a conference table and chairs to allow for gaze awareness and a full immersion feeling in one embodiment.

Referring back to FIG. 1B, each content node 130 includes A/V gear 134 and gear control 136. A/V gear 134 includes any type, number, and combination of audio and video input and output devices such as the example input devices and output devices listed above. Gear control 136 includes any suitable control unit configured to provide wired or wireless control signals to A/V gear 134 and A/V switch 115 such as a controller from AMX Corporation. Gear control 136 may provide network or non-network control signals to A/V gear 134, but only provides non-network control signals to A/V switch 115.

FIGS. 3A-3C are block diagrams illustrating embodiments 132A, 132B, and 132C of A/V gear 132 in content node 130.

In FIG. 3A, A/V gear 132A includes a videoconference system 302 with any suitable type, number, and combination of input A/V devices 304 and output A/V devices 306, such as the example input devices and output devices listed above, and a control unit 132. Control unit 308 connects to network connection 132 and A/V connections 112 to provide A/V data from network 140 to collaboration node 110 and output A/V devices 306 and from collaboration node 110 to network 140 and output A/V devices 306. Control unit 308 also provides A/V data from input A/V devices 304 to collaboration node 110 and network 140. Control unit 308 may operate in response to control signals from gear control 136 (shown in FIG. 1B).

In FIG. 3B, A/V gear 132B includes a media player and/or recorder 312 that connects to A/V connections 112. Media player/recorder 312 may operate in response to control signals from gear control 136 (shown in FIG. 1B).

Media player/recorder 312 provides A/V data from a media 314 to collaboration node 110 across connections 112. Media 314 may be any suitable media that stores pre-recorded A/V data such as a DVD, HD-DVD™, Blu-ray™, or other optical or non-optical media.

In addition to or in place of providing A/V data to collaboration node 110, media player/recorder 312 stores A/V data from collaboration node 110 across connections 112 to media 314. Media 314 may be any suitable media that stores A/V data from collaboration node 110 such as a DVD-R. In this mode of operation, media player/recorder 312 may perform meeting archival functions to record all or selected portions of a collaborative session.

In FIG. 3C, A/V gear 132C includes videoconference system 302, media player/recorder 312 with media 314, an A/V switch 320, and a compositor 322. A/V switch 320 provides A/V data between connectors 112 and videoconference system 302, media player/recorder 312, and compositor 322 in response to control signals from gear control 136. Compositor 322 is a video mixing system configured to receive multiple video inputs and scale, position, and/or blend the video inputs into single video image output. Any of videoconference system 302, media player/recorder 312, and compositor 322 may also operate in response to control signals from gear control 136 (shown in FIG. 1B).

Referring back to FIG. 1B, media collaboration system 100B may also include any suitable collaboration environment to control the operation of the components of system 100B. The collaboration environment may allow users to optimize the experience provided by A/V gear 116. Media collaboration system 100B may further include any suitable user interface control the configuration of the media resource routings between connections 112, A/V gear 116, and codecs 118.

With the above embodiments, media collaboration system 100B may be used to cross connect collaboration sessions on different networks (e.g., a collaboration session on network 120 and a collaboration session on network 140). The sessions may be connected in a demonstrably secure fashion to provide secure, reliable transport among two or more sites. These embodiments eliminate the need for a traditional private or untrusted Internet path between the site's networks. Media collaboration system 100B may also be used to provide experience control using gear control 136 in one or more content nodes 130. In addition, media collaboration system 100B may be used to provide collaboration experience replacement. With collaboration experience replacement, different sets of A/V gear may be used for different types of collaborative sessions. For example, A/V gear 116 may be used for one type of collaborative session and A/V gear 134 may be used in place of A/V gear 116 in another type of collaborative session using any suitable control and A/V switching arrangement.

Although the above embodiments have been described above with reference to media data that includes audio and/or video, other embodiments may transport other types of data such as control data configured to operate a remote computer system.

The embodiments described above may demonstrably and understandably secure transfer of collaboration media between networks without an IP connection between the networks. The embodiments may also provide a collaboration environment customization mechanism for use by, e.g. A/V integrators, for more efficient flexible customization of a desired collaboration environment without the need for IT support on a continuing use basis. The embodiments may further provide for transport of pre-mixed mixed audio and video streams, such as "session audio" stream, that are useful for applications such as session archival. In addition, the embodiments may allow collaboration between collaborative sessions that are incompatible in the session management standards or media stream formats.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the optical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited by the claims and the equivalents thereof.

The invention claimed is:

1. A system comprising:
a first node configured to receive first data in a first format that specifies a network destination for the first data and convert the first data to second data in a second format that does not specify a network destination for the second data; and
a second node configured to receive the second data from the first node over a first connection and convert the second data to third data in a third format that specifies a network destination for the third data.

2. The system of claim 1 wherein the first and the third formats each include an Internet Protocol (IP) format, and wherein the second format includes an audio/video (A/V) format.

3. The system of claim 2 wherein the first connection is one of a composite video connection, a component video connection, an S-Video connection, an analog HD connection, a balanced stereo audio connection, a SDI connection, a HD-SDI connection, a DVI connection, a DVI-D connection, an HDMI connection, and a VGA connection.

4. The system of claim 1 wherein the first node is a first content node that is configured to receive the first data from a second content node over a first network, wherein the second node is a collaboration node that includes audio/video (A/V) gear configured to generate fourth data, and wherein the collaboration node is configured to provide the third data and the fourth data to a second network.

5. The system of claim 4 wherein the first content node includes at least one of a video conference system, a media player, and an audio/video (A/V) switch.

6. The system of claim 1 wherein the first node is a collaboration node that is configured to receive the first data from a first network, wherein the collaboration node includes first audio/video (A/V) gear configured to output the second data, and wherein the second node is a first content node that is configured to provide the third data to a second content node on a second network.

7. The system of claim 6 wherein the first and the second content nodes include second and third audio/video (A/V) gear, respectively, and wherein the second and the third audio/video (A/V) gear are configured to output the third data.

8. The system of claim 1 wherein the first node is configured to provide control signals to the second node over a second connection in a control format that does not specify a network destination for the control signals.

9. The system of claim 1 wherein the second node is configured to provide the third data to a network that is connected to the network destination that is specified for the third data.

10. A method comprising:
providing a first node that is configured to receive first data from a first network in a first format that specifies a network destination for the first data and convert the first data to second data in a second format that does not specify a network destination for the second data; and
connecting the first node to a second node that is configured to receive the second data from the first node over a first connection and convert the second data to third data in a third format that specifies a network destination for the third data on a second network.

11. The method of claim 10 wherein the first and the third formats each include an Internet Protocol (IP) format, and wherein the second format includes an audio/video (A/V) format.

12. The method of claim 10 further comprising:
providing gear control configured to provide control signals over a second connection between the first node and the second node.

13. The method of claim 10 wherein the second node is configured to receive fourth data from the second network in a fourth format that specifies a network destination for the fourth data and convert the fourth data to fifth data in a fifth format that does not specify a network destination for the fifth data, wherein the first node is configured to receive the fifth data from the second node over a second connection and convert the fifth data to sixth data in a sixth format that specifies a network destination for the sixth data on the first network.

14. The method of claim 10 wherein the first node is a first content node that is configured to receive the first data from a second content node over the first network, wherein the second node is a collaboration node that includes audio/video (A/V) gear configured to generate fourth data, and wherein the collaboration node is configured to provide the third data and the fourth data to the second network.

15. The method of claim 10 wherein the first node is a collaboration node that is configured to receive the first data from the first network, wherein the collaboration node includes first audio/video (A/V) gear configured to output the second data, and wherein the second node is a first content node that is configured to provide the third data to a second content node on the second network.

16. A system comprising:
means for receiving first audio/video (A/V) data from a first network in a first format that specifies a network destination for the first A/V data;
means for converting the first A/V data to second A/V data in a second format that does not specify a network destination for the second A/V data;
means for providing the second A/V data over a first A/V connection;
means for converting the second A/V data from the first A/V connection to third A/V data in a third format that specifies a network destination for the third A/V data; and
means for providing the third A/V data to the network destination specified by the third A/V data over a second network.

17. The system of claim 16 wherein the first and the third formats each include an Internet Protocol (IP) format, and wherein the second format includes an audio/video (A/V) format.

18. The system of claim 16 further comprising:
means for outputting the third A/V data in a first location as part of a videoconference.

19. The system of claim 18 further comprising:
means for outputting the first A/V data in a second location as part of the videoconference.

20. The system of claim 16 further comprising:
means for receiving fourth audio/video (A/V) data from the second network in a fourth format that specifies a network destination for the fourth A/V data;
means for converting the fourth A/V data to fifth A/V data in a fifth format that does not specify a network destination for the fifth A/V data;

means for providing the fifth A/V data over a second A/V connection;

means for converting the fifth A/V data from the second A/V connection to sixth A/V data in a sixth format that specifies a network destination for the sixth A/V data; and means for providing the sixth A/V data to the network destination specified by the sixth A/V data over the first network.

21. A method comprising:

receiving first audio/video (A/V) data from a first network in a first format that specifies a network destination for the first A/V data;

converting the first A/V data to second A/V data in a second format that does not specify a network destination for the second data;

receiving the second A/V data over an A/V connection;

converting the second A/V data to third A/V data in a third format that specifies a network destination for the third A/V data; and providing the third A/V data to the network destination specified by the third A/V data over a second network.

22. The method of claim 21 wherein the first and the third formats each include an Internet Protocol (IP) format, and wherein the second format includes an audio/video (A/V) format.

23. The method of claim 21 further comprising:

outputting the third A/V data in a first location as part of a videoconference.

24. The method of claim 23 further comprising:

outputting the first A/V data in a second location as part of the videoconference.

25. The method of claim 21 further comprising:

receiving fourth audio/video (A/V) data from the second network in a fourth format that specifies a network destination for the fourth A/V data;

converting the fourth A/V data to fifth A/V data in a fifth format that does not specify a network destination for the fifth A/V data;

providing the fifth A/V data over a second A/V connection;

converting the fifth A/V data from the second A/V connection to sixth A/V data in a sixth format that specifies a network destination for the sixth A/V data; and providing the sixth A/V data to the network destination specified by the sixth A/V data over the first network.

* * * * *